(12) United States Patent
Pernot et al.

(10) Patent No.: US 8,822,098 B2
(45) Date of Patent: Sep. 2, 2014

(54) MANUFACTURING/ASSEMBLY OF A FUEL DISTRIBUTOR ASSEMBLY

(71) Applicant: GM Global Technology Operations LLC, Detroit, MI (US)

(72) Inventors: Matthew T. Pernot, Rochester, NY (US); Roger M. Brisbane, Spencerport, NY (US); Courtney E. Reich, Fairport, NY (US); Edward D. Groninger, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 13/716,904

(22) Filed: Dec. 17, 2012

(65) Prior Publication Data
US 2014/0170520 A1    Jun. 19, 2014

(51) Int. Cl.
*H01M 8/24*        (2006.01)
*H01M 8/04*        (2006.01)

(52) U.S. Cl.
CPC ............................... *H01M 8/04089* (2013.01)
USPC .......................... 429/458; 429/454; 429/456

(58) Field of Classification Search
CPC ................................................ H01M 8/04089
USPC .......................... 429/458, 456, 454; 239/589
See application file for complete search history.

(56) References Cited

U.S. PATENT DOCUMENTS

| 4,629,560 | A  | * | 12/1986 | Harris ............................ 210/184 |
| 7,454,914 | B2 | * | 11/2008 | Prociw ............................. 60/772 |
| 2007/0037028 | A1 | * | 2/2007 | Chiang et al. .................... 429/26 |
| 2011/0042476 | A1 | * | 2/2011 | McAlister ......................... 239/5 |

* cited by examiner

*Primary Examiner* — Nicholas P D'Aniello
(74) *Attorney, Agent, or Firm* — Brooks Kushman P.C.

(57) ABSTRACT

A fuel distributor assembly for a fuel cell stack that includes an inner shell positioned within an outer shell. The outer shell is curved to define a central longitudinal chamber, a first longitudinal edge and a second longitudinal edge. The outer shell also has an inner wall surface and an outer wall surface. The first longitudinal edge and the second longitudinal edge in combination define a longitudinal slot. The first longitudinal edge is bent inwardly towards the longitudinal chamber to form a longitudinal lip. The inner shell includes a plurality of ribs extending outwardly and contacting the inner wall surface of the outer shell. The inner shell, the outer shell, the lip, and the ribs define a plurality of flow channels. The inner shell has a length along which a plurality of apertures are positioned in a partial helical pattern. A method of forming the fuel distributor is also provided.

20 Claims, 12 Drawing Sheets

MANUFACTURING/ASSEMBLY OF A FUEL DISTRIBUTOR ASSEMBLY

The present invention relates to fuel cell stacks, and in particular, to fuel cell stacks using a fuel distributor for providing fuel to the fuel cells in such stacks.

BACKGROUND OF THE INVENTION

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Accordingly, there is a need for improved systems that distribute fuel to each fuel cell in a fuel cell stack.

SUMMARY OF THE INVENTION

The present invention solves one or more problems of the prior art by providing in at least one embodiment, a fuel distributor assembly for a fuel cell stack that includes a plurality of fuel cells. The fuel distributor comprises an outer shell comprising a sheet and an inner shell positioned within the outer shell. The sheet is curved to define a central longitudinal chamber, a first longitudinal edge and a second longitudinal edge. The outer shell also has an inner wall surface and an outer wall surface. The first longitudinal edge and the second longitudinal edge in combination define a longitudinal slot. The first longitudinal edge is bent inwardly towards the longitudinal chamber to form a longitudinal lip. The inner shell is positioned within the outer shell. The inner shell includes a plurality of ribs extending outwardly and contacting the inner wall surface of the outer shell. The inner shell, the outer shell, the lip, and the ribs define a plurality of flow channels. The inner shell has a length along which a plurality of apertures are positioned in a partial helical pattern. The inner shell receives fuel that is provided to the plurality of apertures such that fuel flows within the flow channels and emerges from the slot to be introduced into the fuel cells.

In another embodiment, a fuel distributor assembly for a fuel cell stack that includes a plurality of fuel cells is provided. The fuel distributor includes an outer shell and an inner shell that is positioned within the outer shell. The outer shell includes a sheet that is curved to define a central longitudinal chamber, a first longitudinal edge and a second longitudinal edge. The outer shell has an inner wall surface and an outer wall surface. The first longitudinal edge and the second longitudinal edge define a longitudinal slot that is bent inwardly towards the longitudinal chamber to form a longitudinal lip. The inner shell includes a plurality of ribs, a first shell section and a second shell section. The ribs extend outwardly and contact the inner wall surface of the outer shell. The first shell section attaches to the second shell section to form the inner shell. Each rib partially extends around the inner shell and has a first rib end and a second rib end such that the lip is positioned proximate to the first rib end. The inner shell, the outer shell, the lip, and the ribs define in combination a plurality of flow channels. The inner shell has a length along which a plurality of apertures are positioned in a partial helical pattern. The inner shell receives fuel which is provided to the plurality of apertures such that fuel flows within the flow channels and emerges from the slot.

In another embodiment, a method of forming the fuel distributors set forth above is provided. The method includes a step of extrusion molding a first plastic composition to form an outer shell. The outer shell includes a sheet which defines a central longitudinal chamber, a first longitudinal edge and a second longitudinal edge. The outer shell has an inner wall surface and an outer wall surface. The first longitudinal edge and the second longitudinal edge define a longitudinal slot which is bent inwardly towards the longitudinal chamber to form a longitudinal lip. A second plastic composition is injection molded to form a first shell section that includes a first plurality of rib sections extending outwardly from an outer surface of the first shell section. A third plastic composition is injection molded to form a second shell section that includes a second plurality of rib sections extending outwardly from an outer surface of the second shell section. The first shell section is attached to the second shell section to form the inner shell wherein the first plurality of rib sections mate with the second plurality of rib sections to form a plurality of ribs. Each rib partially extends around the inner shell and has a first rib end and a second rib end such that the lip is positioned proximate to the first rib end. The inner shell is placed within the outer shell by sliding the outer shell over the inner shell. The inner shell, the outer shell, the lip, and the ribs define in combination a plurality of flow channels. The inner shell has a length along which a plurality of apertures are positioned in a partial helical pattern. The inner shell receives fuel which is provided to the plurality of apertures such that fuel flows within the flow channels and emerges from the slot.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
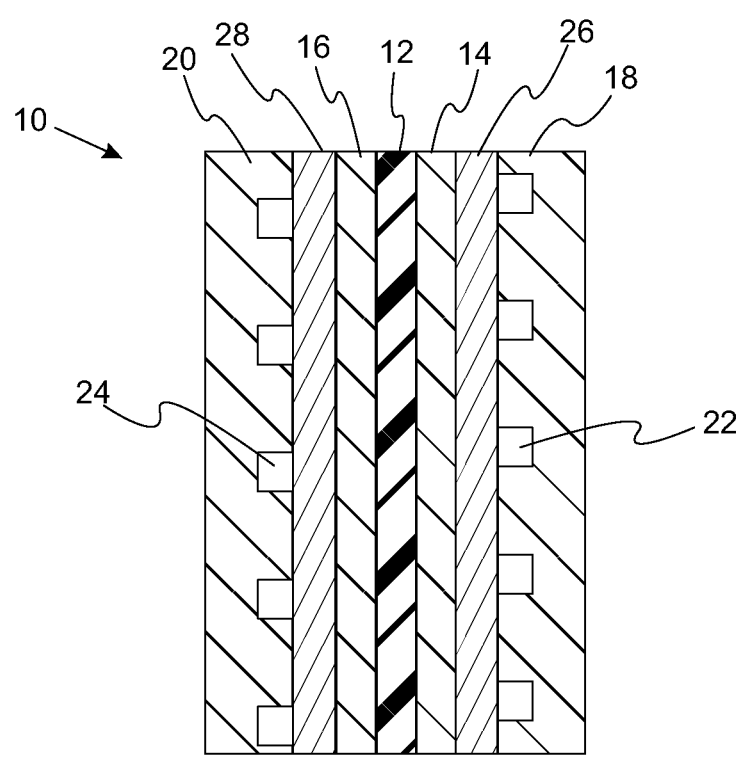
FIG. 1 provides a schematic illustration of a fuel cell that is incorporated in a fuel cell stack.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a schematic cross section of a fuel cell that incorporates an embodiment of a fibrous sheet is provided. Proton exchange membrane (PEM) fuel cell 10 includes polymeric ion conducting membrane 12 disposed between cathode catalyst layer 14 and anode catalyst layer 16. Fuel cell 10 also includes flow field plates 18, 20, gas channels 22 and 24, and gas diffusion layers 26 and 28. During operation of the fuel cell, a fuel such as hydrogen is feed to the flow field plate 20 on the anode side and an oxidant such as oxygen is feed flow field plate 18 on the cathode side. Hydrogen ions generated by anode catalyst layer 16 migrate through polymeric ion conducting membrane 12 where they react at cathode catalyst layer 14 to form water. This electrochemical process generates an electric current through a load connect to flow field plates 18 and 20. Typically, a plurality of fuel cells of the general design of fuel cell 10 is incorporated into a fuel cell stack. Advantageously, a reactant gas (i.e., hydrogen or oxygen) is provided to flow field plates 18 and/or 20 by a flow distributor as set forth below.

Figure 2:
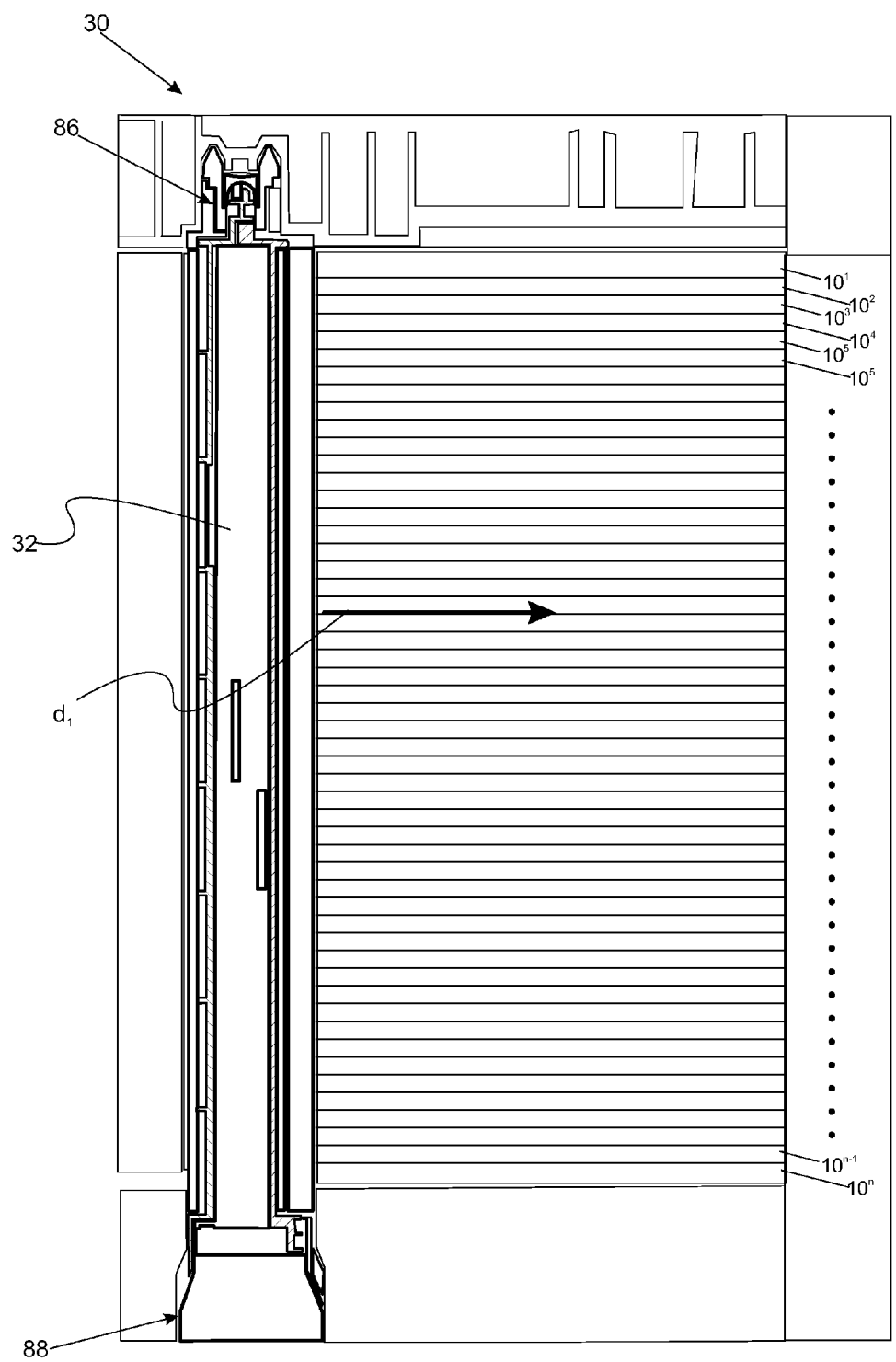
FIG. 2 is a schematic illustration of a fuel cell stack incorporating a fuel distributor.

With reference to FIG. 2, a schematic illustration of a fuel cell stack with a flow distributor is provided. Fuel cell stack 30 includes a plurality of fuel cells $10^i$. In a refinement, each fuel cell in the plurality of fuel cells $10^i$ is of the general design of FIG. 1. Fuel distributor 32 provides a first reactant to either the cathode side or anode side of each fuel cell in the plurality of fuel cells $10^i$.

Figure 3:
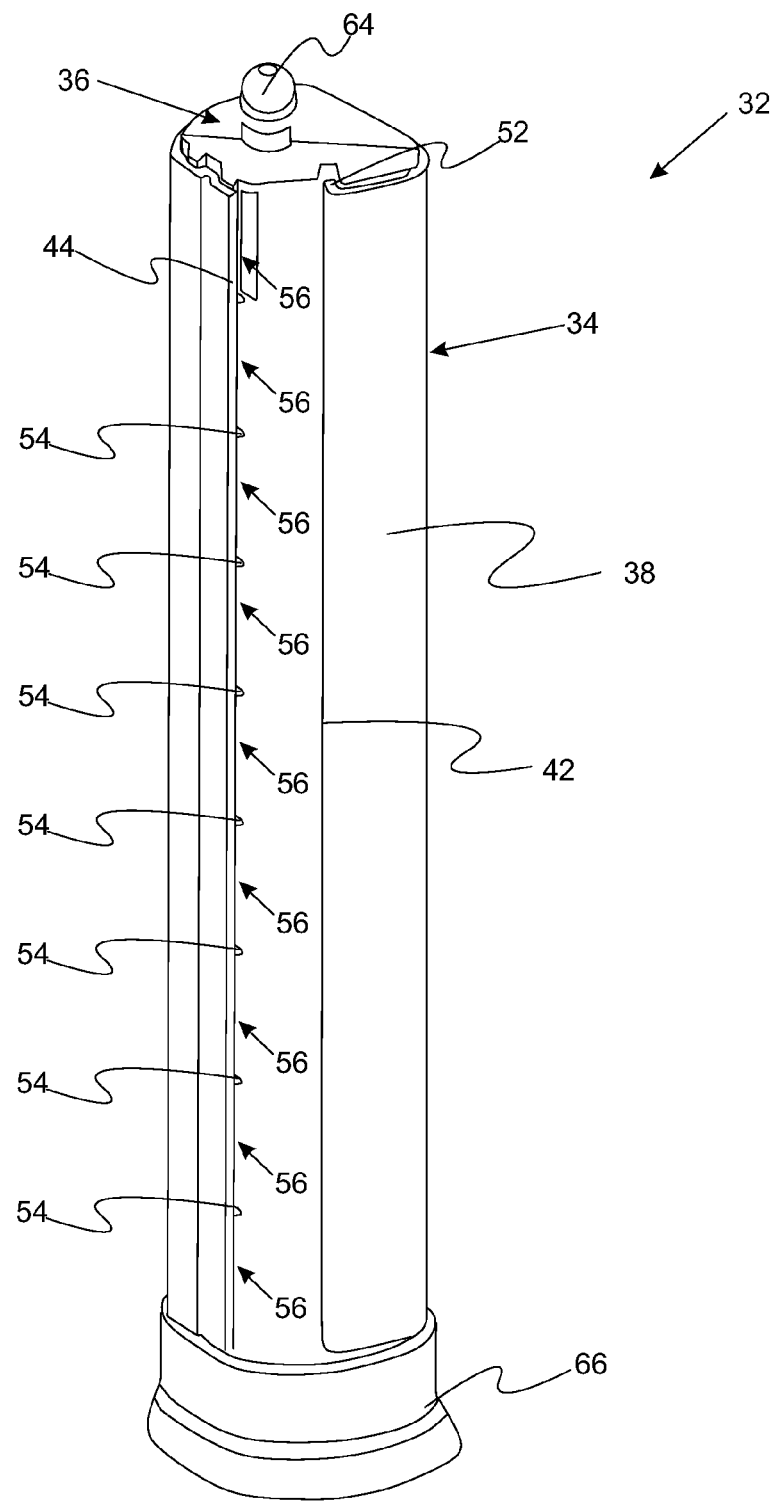
FIG. 3 is a perspective view of a fuel distributor.
Figure 4:
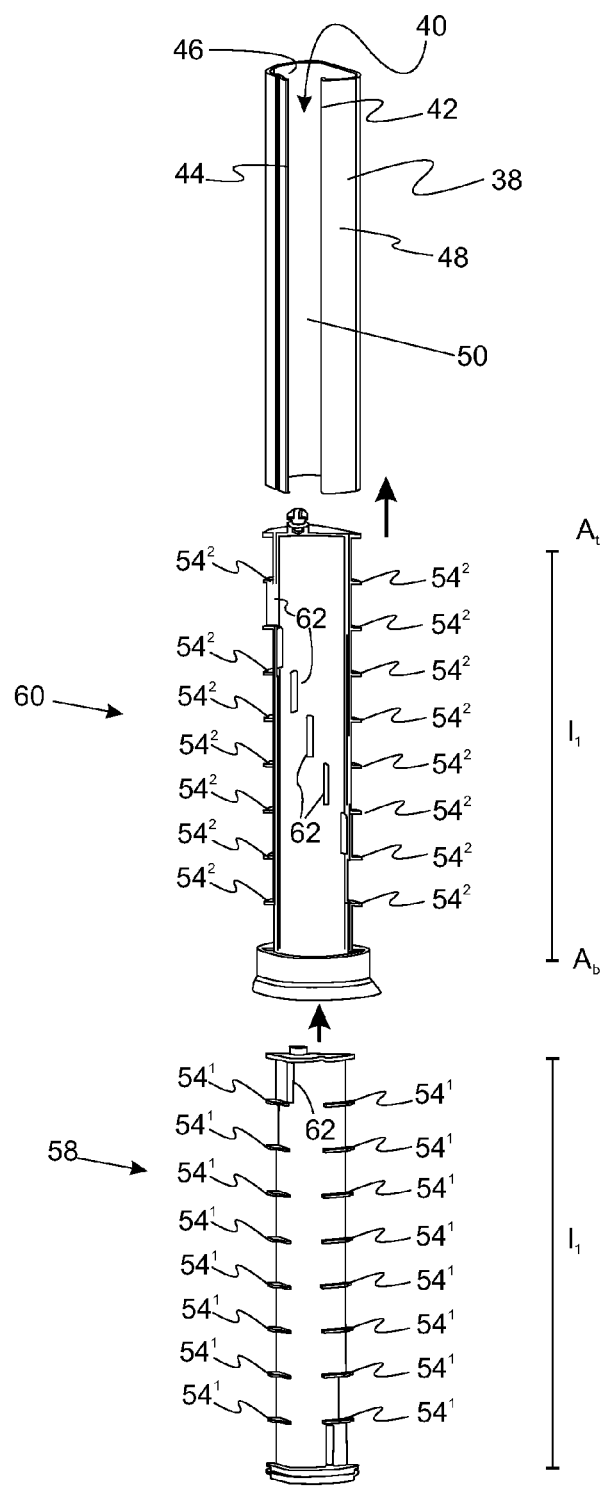
FIG. 4 is an exploded view of the fuel distributor of FIG. 3.

With reference to FIGS. 3 and 4, schematics of a fuel distributor are provided. FIG. 3 is a perspective view of the fuel distributor while FIG. 4 is an exploded view of the fuel distributor. Fuel distributor 32 includes outer shell 34 and inner shell 36. Inner shell 36 and outer shell 34 are each independently plastic. Outer shell 34 includes a sheet 38 which is curved to form central longitudinal chamber 40, a first longitudinal edge 42 and a second longitudinal edge 44. Outer shell 34 also has an inner wall surface 46 and an outer wall surface 48. The first longitudinal edge 42 and the second longitudinal edge 44 in combination define a longitudinal slot 50. The first longitudinal edge is bent inwardly towards the longitudinal chamber to form a longitudinal lip 52. The inner shell 36 is positioned within the outer shell 34. The inner shell 36 defines an interior cavity that receives fuel and includes a plurality of ribs 54 extending outwardly and contacting the inner wall surface 46 of the outer shell 36 when inner shell 36 is positioned therein. Each rib of the plurality of ribs partially extends around the inner shell having a first rib end and a second rib end such that the lip is positioned proximate to the first rib end. The inner shell 36, the outer shell 34, the lip 52, and the ribs 54 define in combination a plurality of flow channels 56. Characteristically, inner shell 56 is formed from first shell section 58 and second shell section 60 which are described below in more detail. First shell section 58 is attached to second shell section 60 to form the inner shell 36 wherein the first plurality of rib sections $54^1$ mate with the second plurality of ribs sections $54^2$ to form a plurality of ribs 54. The inner shell 36 has a length $l_1$ along which a plurality of apertures 62 are positioned in a partial helical pattern. The inner shell 36 receives fuel that is provided to the plurality of apertures 62 such that fuel flows from the inner cavity and then within the flow channels 56 and emerges from the slot 50 to be introduced into the fuel cells $10^i$ (FIG. 2). Fuel distributor 32 also includes sealing component 64 for sealing on the wet end and sealing component 66 for sealing on the dry end.

Figure 5A:
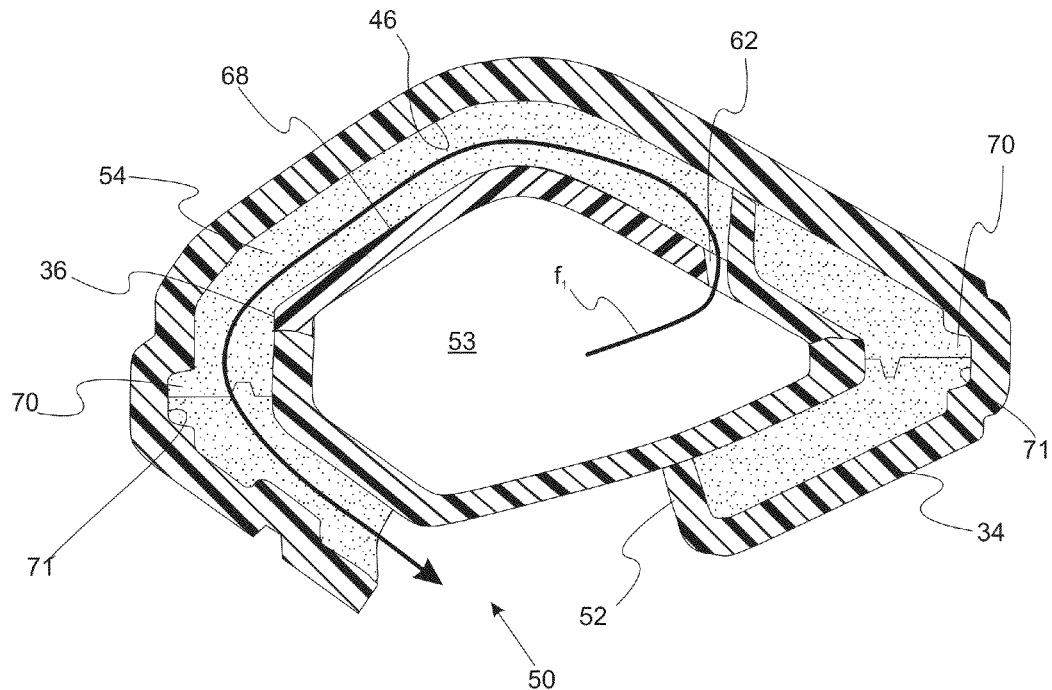
FIG. 5A is a cross section showing a top view of a flow channel.
Figure 5B:
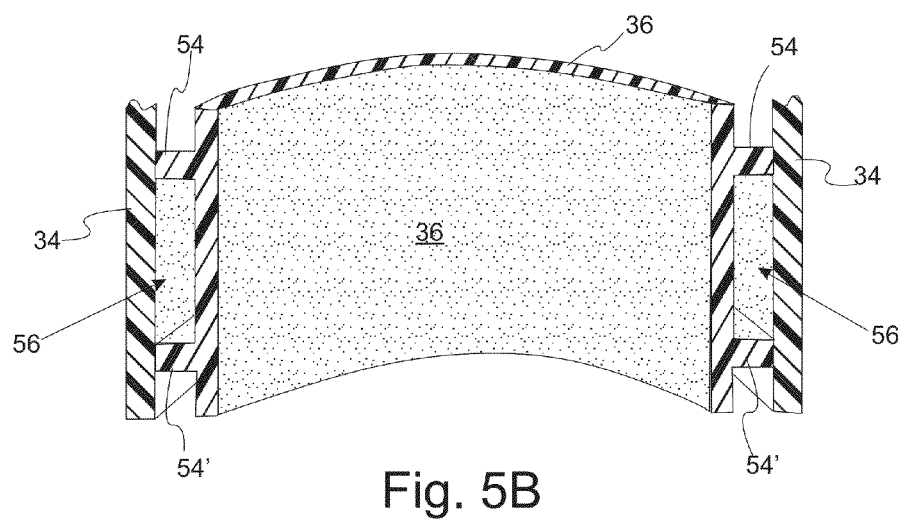
FIG. 5B is a cross section showing a side view of a flow channel.
Figure 5C:
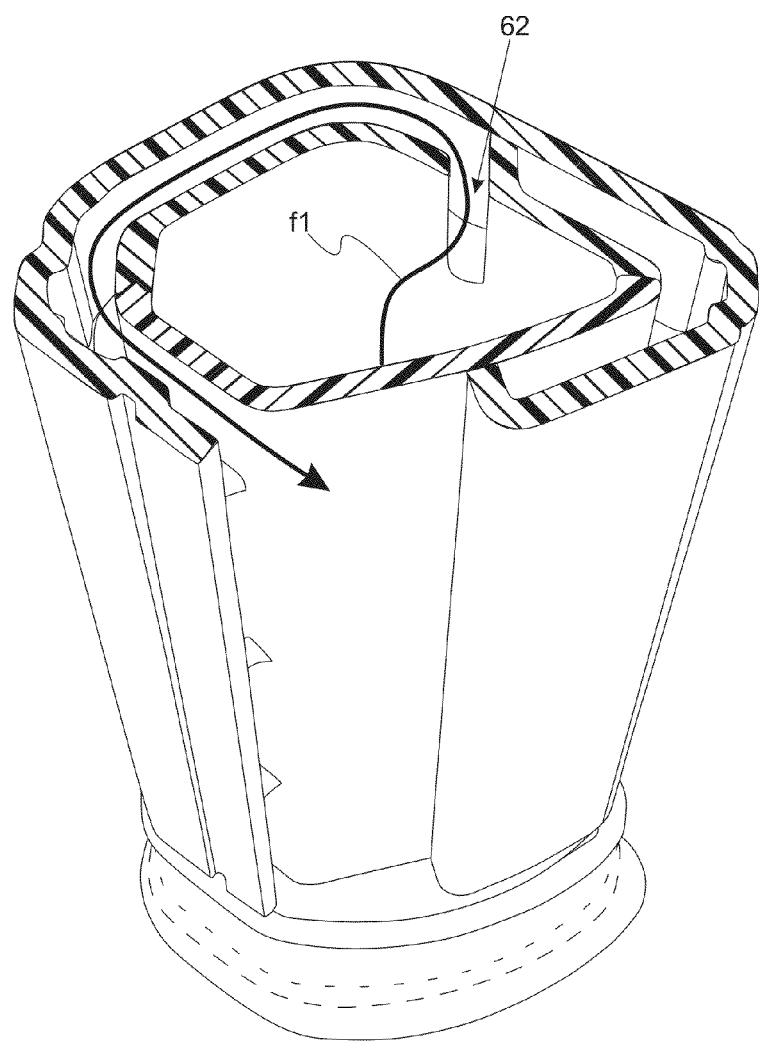
FIG. 5C is a perspective view of a flow channel.
Figure 6A:
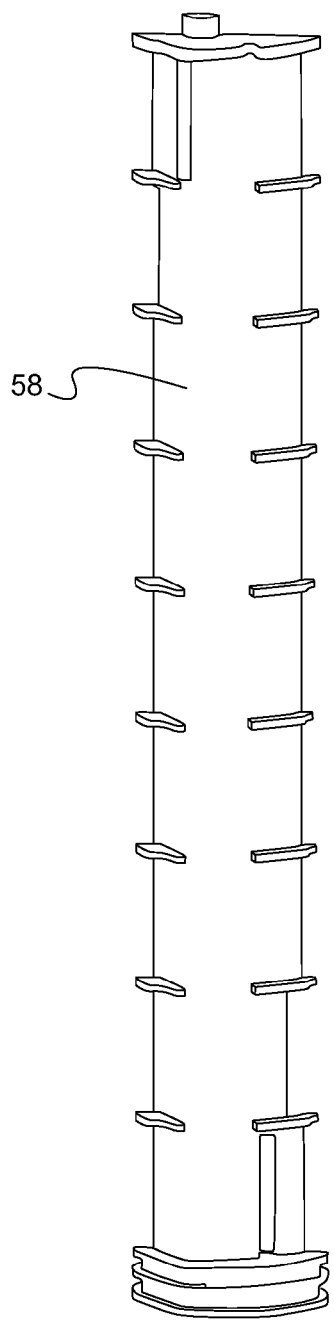
FIGS. 6A and 6B are perspective views of a first section of an inner shell used in the fuel distributor of FIG. 2.
Figure 6B:
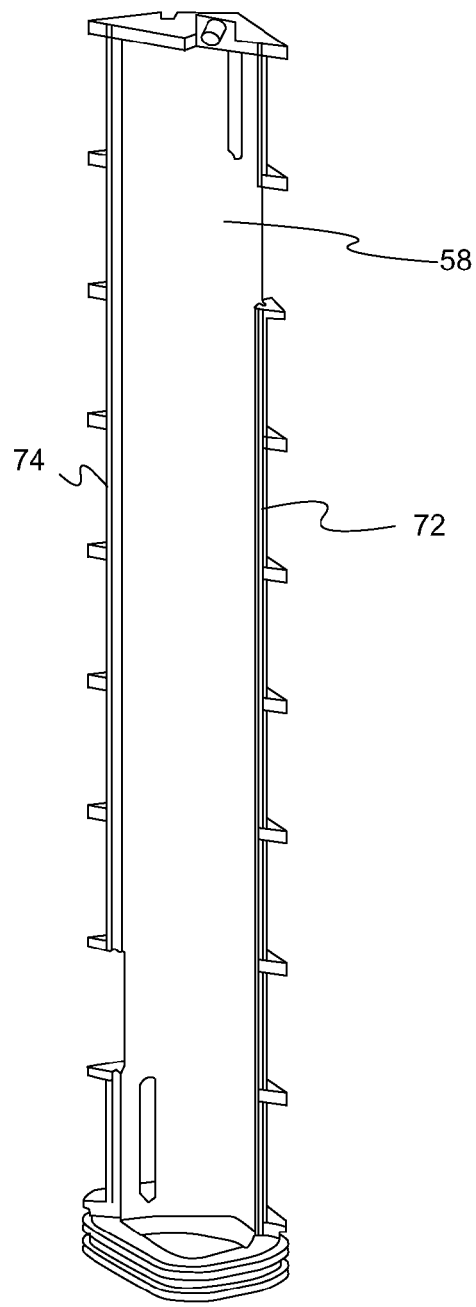
Figure 7A:
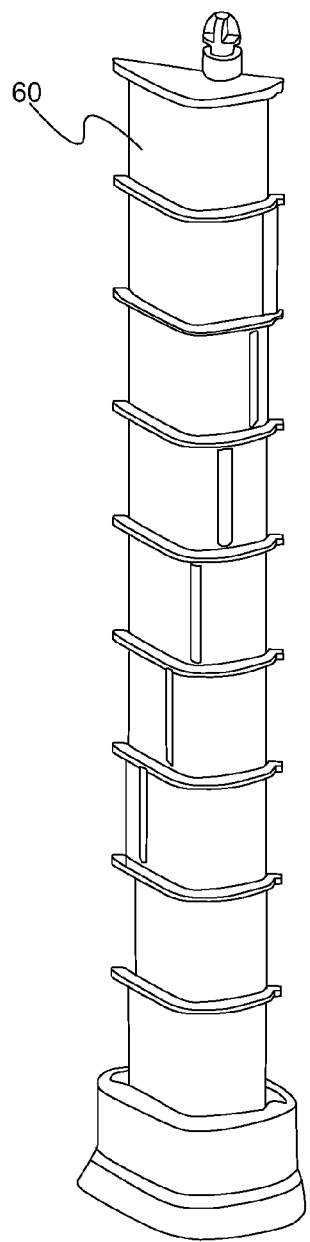
FIGS. 7A and 7B are perspective views of a first section of an inner shell used in the fuel distributor of FIG. 2.
Figure 7B:
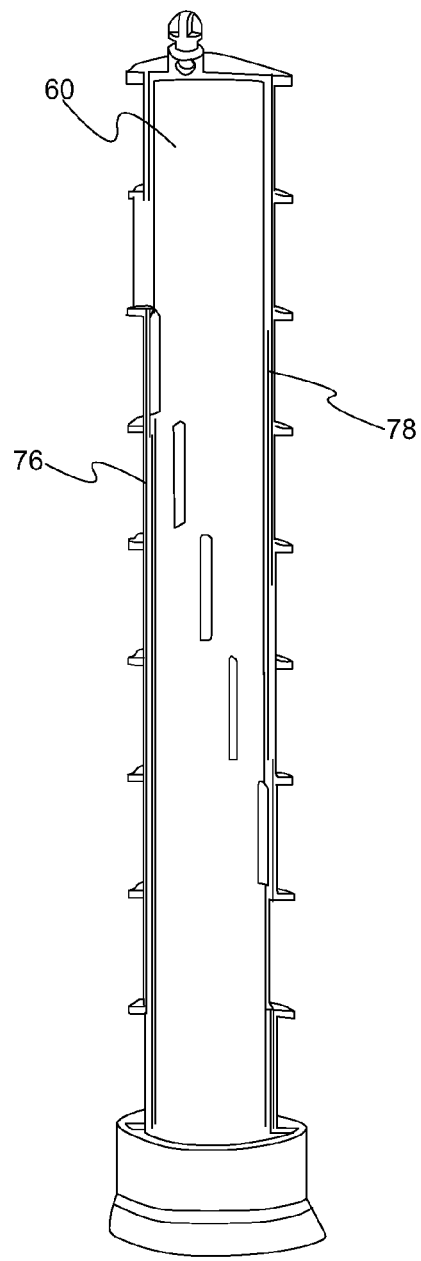
Figure 8:
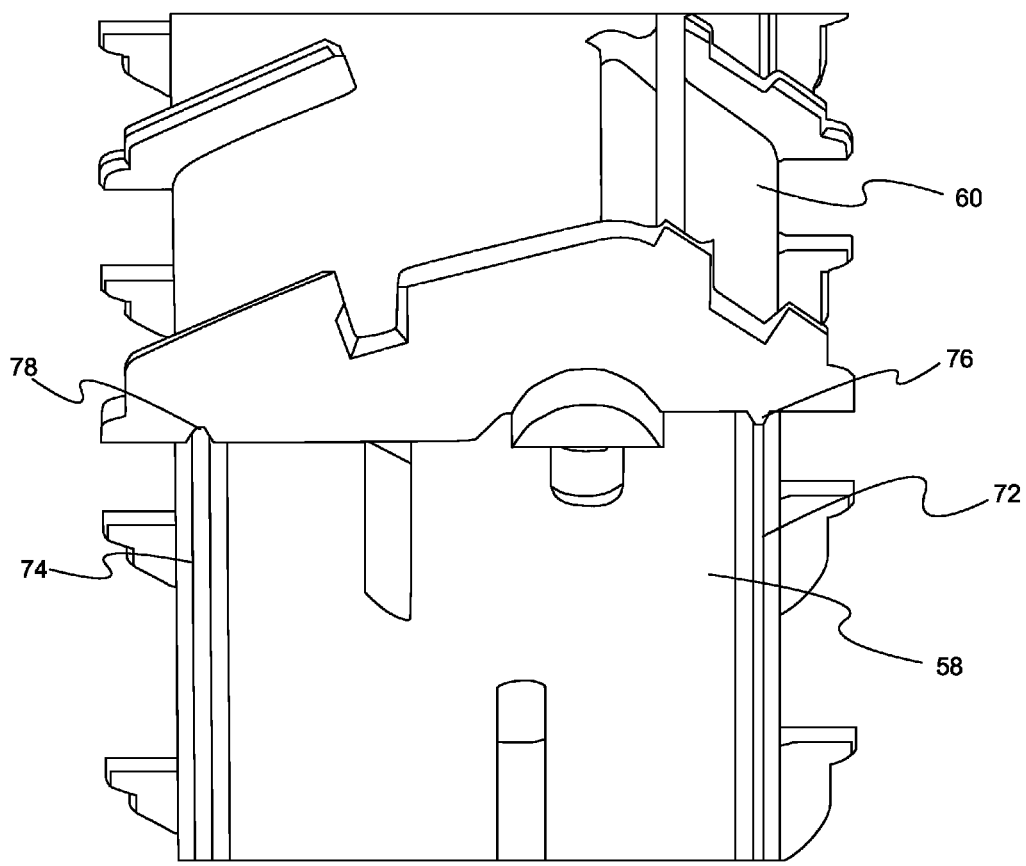
FIG. 8 is a perspective view of the first section of FIGS. 6 and 7 mating to form an inner shell.

With reference to FIGS. 5A, 5B, and 5C, schematics illustrating the assembly of inner shell 36, the outer shell 34, the lip 52, and the ribs 54 to form flow channels 56 are provided. Ribs 54 and 54' define the upper and lower surfaces of flow channel 56. Inner shell surface 68 of inner shell 36 and inner wall surface 46 form the side wall surfaces of flow channel 56. Finally, lip 52 caps off the end of flow channel 56. In a refinement, inner shell 36 includes a plurality of notches 70 that mate to a plurality of grooves 71 in outer shell 34 when the inner shell is positioned within the outer shell. The flow $f_1$ from inner cavity 53 enters flow channel 56 via aperture 58 and flows within channel 56 toward slot 50.

With reference to FIGS. 6A, 6B, 7A, 7B, and 8, schematics illustrating the assembly of inner shell 36 from first shell section 58 and inner second section 60 are provided. First shell section 58 attaches to second shell section 60 to form inner shell 36. Typically, first shell section includes edge details 72, 74 that mate to edge details 76, 78 respectively of second edge section 60. In a refinement, first edge details 74, 76 include edge protrusions, and edge details 72, 78 include edge slots.

Figure 9:
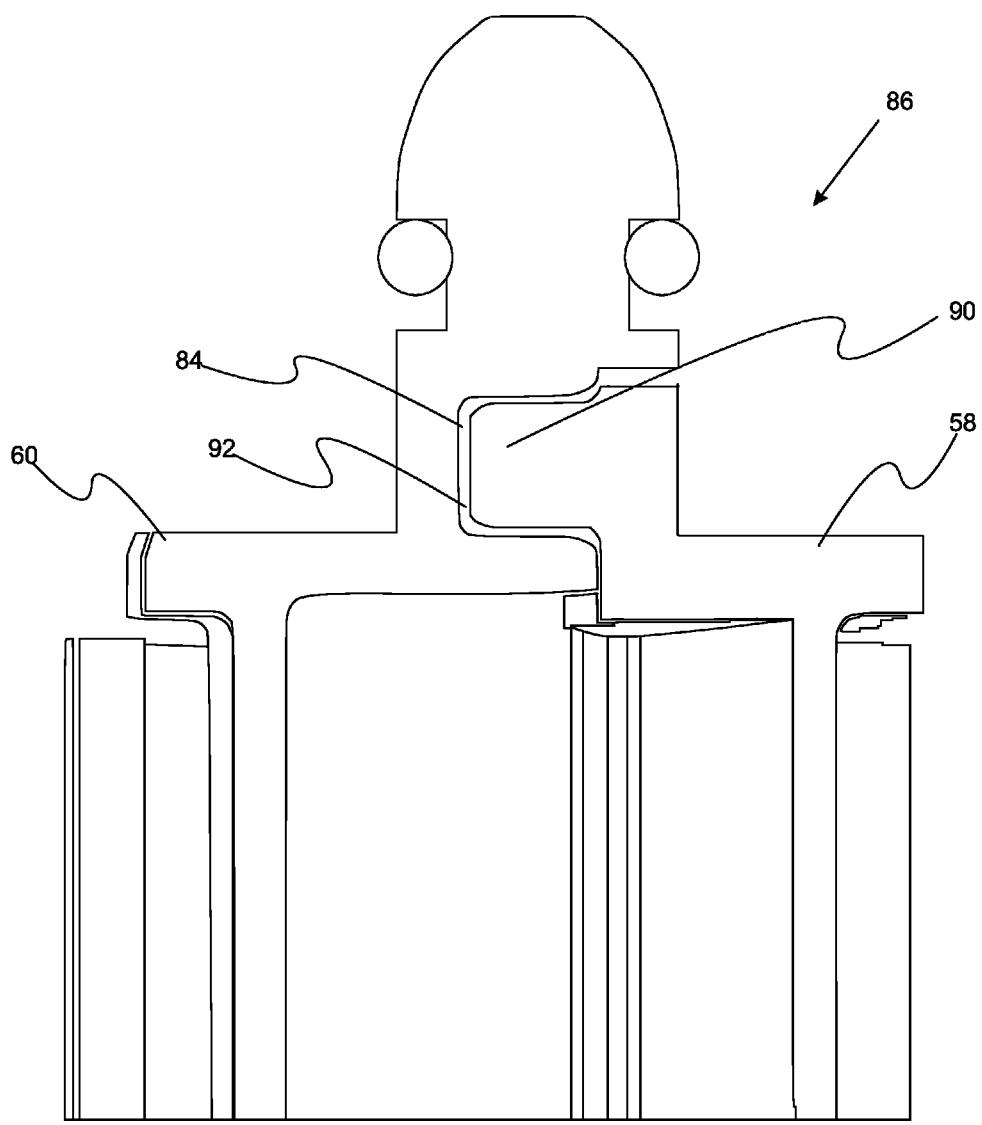
FIG. 9 is a perspective view of the second section of FIGS. 6 and 7 mating to form an inner shell.
Figure 10:
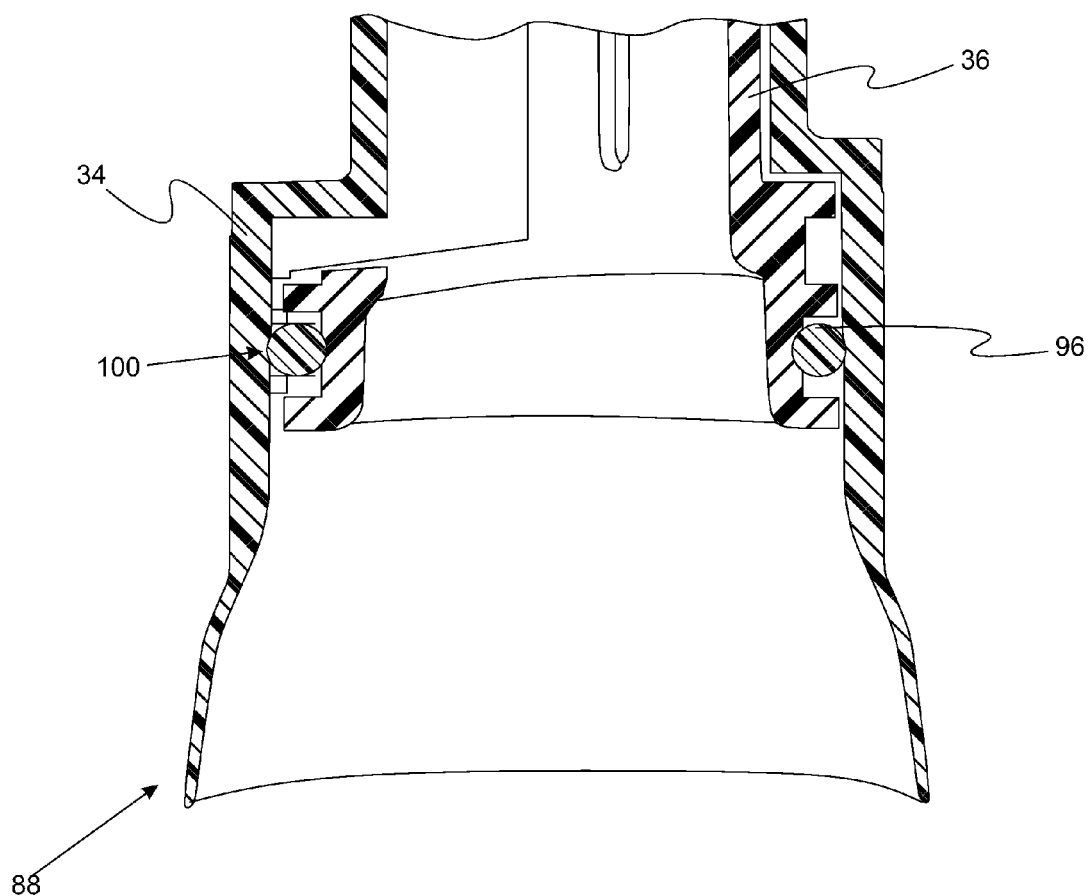
FIG. 10 is a cross sectional view of the bottom of the inner shell of the fuel distributor of FIG. 2.
Figure 11:
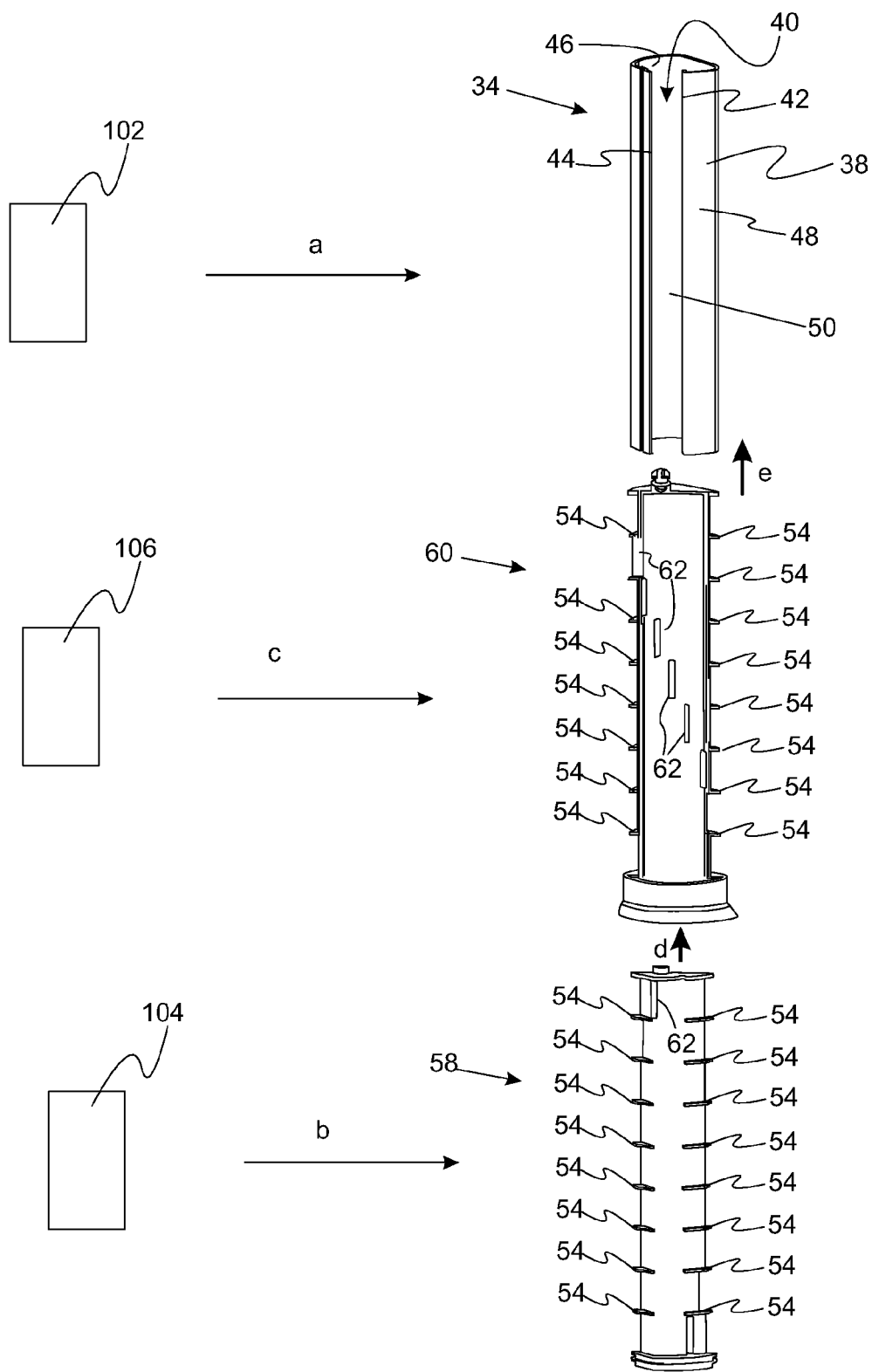
FIG. 11 is a schematic flow chart showing the fabrication of the fuel distributor of FIG. 2.

With reference to FIGS. 2, 9 and 10, schematic illustrations of features at the ends of a fuel distributor are provided. FIG. 9 is a schematic illustration of a seal of a first end of fuel distributor 32. Fuel distributor 32 includes first end 86 and second end 88. In this variation, first shell section 58 and second shell section 60 combine together to form seal 84 on the first end 86 of a fuel cell stack. First shell section 58 includes protrusion 90 which is received by groove 92 in second shell section 60 to form seal 84. FIG. 10 provides a schematic illustration of a seal at second end 88 of fuel distributor 32. First shell section 58 includes first rim sealing section 94 which includes O-ring grooves 96 formed therein. Second shell section 60 includes second rim sealing section 98. First rim sealing section 94 is positioned within the second rim sealing section 98 to form the seal 100.

With reference to FIGS. 3-10, a method for making the fuel distributors set forth above is provided. The method includes step a) in which a first plastic composition 102 (e.g., a plastic resin) is extrusion molding to form an outer shell 34. The outer shell includes a sheet which defines a central longitudinal chamber 40, a first longitudinal edge 42, and a second longitudinal edge 44. Outer shell 34 has an inner wall surface 46 and an outer wall surface 48. The first longitudinal edge 42 and the second longitudinal edge 44 define a longitudinal slot 50 which is bent inwardly towards the longitudinal chamber to form a longitudinal lip 52. In step b), second plastic composition 104 is injection molded to form first shell section 58 that includes a first plurality of rib sections 54 extending outwardly from an outer surface of first shell section 58. In step c), third plastic composition 104 is injection molded to form second shell section 60 that includes a second plurality of rib sections $54^2$ extending outwardly from an outer surface of second shell section 60. In step d), first shell section 58 is attached to second shell section 60 to form the inner shell 36 wherein the first plurality of rib sections $54^1$ mate with the second plurality of rib sections $54^2$ to form a plurality of ribs 54. Each rib 54 partially extends around the inner shell 36 and having a first rib end and a second rib end such that the lip 52 is positioned proximate to the first rib end. In step d), the inner shell 36 is placed within the outer shell by sliding the outer shell 34 over the inner shell 36. The inner shell 36, the outer shell 34, the lip 52, and the ribs 54 define in combination a plurality of flow channels 56. The inner shell 36 has a length $l_1$ along which a plurality of apertures 58 are positioned in a partial helical pattern. The inner shell 36 receives fuel which is provided to the plurality of apertures such that fuel flows within the flow channels and emerges from the slot 50.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel distributor assembly for a fuel cell stack, the fuel cell stack including a plurality of fuel cells, the fuel distributor comprising:
    an outer shell comprising a sheet, the sheet curved to define a central longitudinal chamber, a first longitudinal edge and a second longitudinal edge, the outer shell having an inner wall surface and an outer wall surface, the first longitudinal edge and the second longitudinal edge defining a longitudinal slot, the first longitudinal edge being bent inwardly towards the longitudinal chamber to form a longitudinal lip; and
    an inner shell positioned within the outer shell, the inner shell including a plurality of ribs extending outwardly and contacting the inner wall surface of the outer shell wherein the inner shell, the outer shell, the lip, and the ribs define a plurality of flow channels, the inner shell having a length along which a plurality of apertures are positioned in a partial helical pattern, the inner shell receiving fuel that is provided to the plurality of apertures such that fuel flows within the flow channels and emerges from the slot.

2. The fuel distributor of claim 1 wherein the inner shell is formed from a first shell section and a second shell section, the first shell section attaching to the second shell section to form the inner shell.

3. The fuel distributor of claim 2 wherein the first shell section and the second shell section combine together to form a first seal on a first end of the fuel distributor.

4. The fuel distributor of claim 3 wherein the first shell section includes a first sealing section having O-ring grooves therein and the second shell section includes a second sealing section such that the first sealing section is positioned within the second sealing section to form a second seal on a second end of the fuel distributor.

5. The fuel distributor of claim 3 wherein the first shell section includes a post at a first shell section end and the second shell section defines an opening at a second shell section end, the post being positioned within the opening.

6. The fuel distributor of claim 3 wherein the first shell section has a first edge detail and the second shell section has a second edge detail, the first edge detail mating with the second edge detail when the first shell section is attached to the second shell section.

7. The fuel distributor of claim 6 wherein the first edge detail includes edge protrusions and edge slots and the second edge detail includes edge protrusions and edge slots.

8. The fuel distributor of claim 1 wherein each rib of the plurality of ribs partially extend around the inner shell having a first rib end and a second rib end such that the lip is positioned proximate to the first rib end.

9. The fuel distributor of claim 1 wherein the inner shell has a plurality of notches and the outer shell has a plurality of grooves, the plurality of notches mating with the plurality of grooves when the inner shell is positioned within the outer shell.

10. The fuel distributor of claim 1 wherein the inner shell and the outer shell are each independently plastic.

11. A fuel cell stack assembly comprising the fuel distributor assembly of claim 1.

12. A fuel distributor assembly for a fuel cell stack, the fuel cell stack including a plurality of fuel cells, the fuel distributor comprising:

an outer shell comprising a sheet, the sheet curved to define a central longitudinal chamber, a first longitudinal edge and a second longitudinal edge, the outer shell having an inner wall surface and an outer wall surface, the first longitudinal edge and the second longitudinal edge defining a longitudinal slot, the first longitudinal edge being bent inwardly towards the longitudinal chamber to form a longitudinal lip; and an inner shell positioned within the outer shell, the inner shell including a plurality of ribs, a first shell section and a second shell section, the ribs extending outwardly and contacting the inner wall surface of the outer shell, the first shell section attaching to the second shell section to form the inner shell, each rib partially extending around the inner shell and having a first rib end and a second rib end such that the lip is positioned proximate to the first rib end, the inner shell, the outer shell, the lip, and the ribs defining in combination a plurality of flow channels, the inner shell having a length along which a plurality of apertures are positioned in a partial helical pattern, the inner shell receiving fuel which is provided to the plurality of apertures such that fuel flows within the flow channels and emerges from the slot.

13. The fuel distributor of claim 12 wherein the first shell section and the second shell section combine together to form a seal on a wet end.

14. The fuel distributor of claim 13 wherein the first shell section includes a first hoop section and the second shell section includes a second hoop section such that the first hoop section is positioned within the second hoop section to form the seal.

15. The fuel distributor of claim 12 wherein the first shell section includes a first hoop section and the second shell section includes a second hoop section such that the first hoop section is positioned within the second hoop section to form the seal.

16. The fuel distributor of claim 12 wherein the first shell section has a first edge detail and the second shell section has a second edge detail, the first edge detail mating with the second edge detail when the first shell section is attached to the second shell section.

17. The fuel distributor of claim 16 wherein the first edge detail includes edge protrusions and edge slots and the second edge detail includes edge protrusions and edge slots.

18. A fuel cell stack assembly comprising the fuel distributor assembly of claim 12.

19. A method of forming a fuel distributor, the method comprising:

extrusion molding a first plastic composition to form an outer shell, the outer shell comprising a sheet which defines a central longitudinal chamber, a first longitudinal edge and a second longitudinal edge, the outer shell having an inner wall surface and an outer wall surface, the first longitudinal edge and the second longitudinal edge defining a longitudinal slot, the first longitudinal edge being bent inwardly towards the longitudinal chamber to form a longitudinal lip; and injection molding a second plastic composition to form a first shell section, the first shell section including a first plurality of rib sections extending outwardly from an outer surface of the first shell section;

injection molding a third plastic composition to form a second shell section, the second shell section including a second plurality of rib sections extending outwardly from an outer surface of the second shell section;

attaching the first shell section to the second shell section to form an inner shell wherein the first plurality of rib sections mate with the second plurality of rib sections to form a plurality of ribs, each rib partially extending around the inner shell and having a first rib end and a second rib end such that the lip is positioned proximate to the first rib end; and placing the inner shell within the outer shell by sliding the outer shell over the inner shell, the inner shell, the outer shell, the lip, and the ribs defining in combination a plurality of flow channels, the inner shell having a length along which a plurality of apertures are positioned in a partial helical pattern, the inner shell receiving fuel which is provided to the plurality of apertures such that fuel flows within the flow channels and emerges from the slot.

20. The method of claim 19 wherein the inner shell includes a stop that sets relative positioning of the inner shell in the outer shell.

* * * * *